Jan. 18, 1927. 1,614,810
J. E. TAYLOR
VIBRATING SCALPER
Filed April 28, 1925
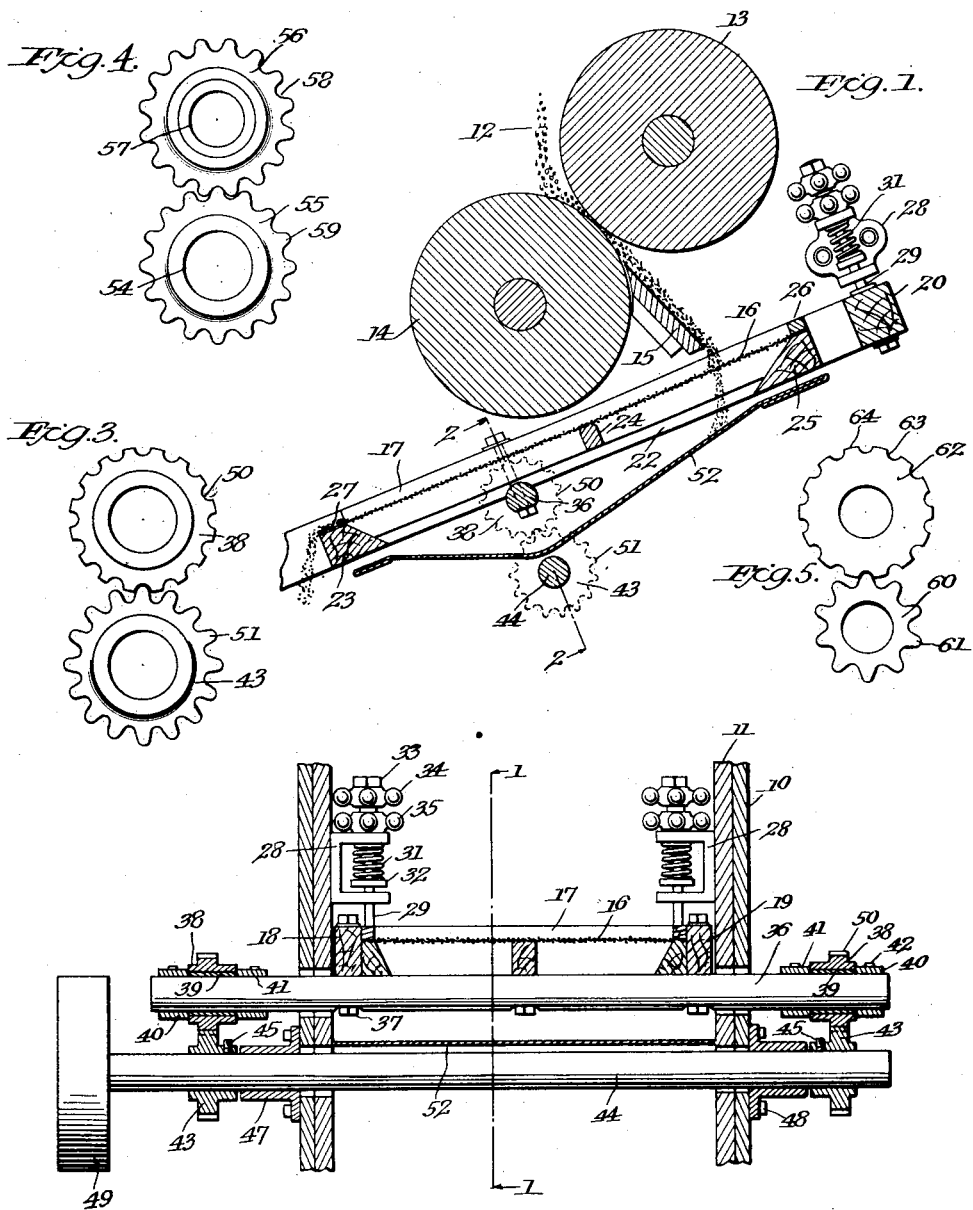
Inventor
John E. Taylor Patented Jan. 18, 1927.

1,614,810

UNITED STATES PATENT OFFICE.

JOHN E. TAYLOR, OF OWENSBORO, KENTUCKY, ASSIGNOR TO THE ANGLO-AMERICAN MILL COMPANY, OF OWENSBORO, KENTUCKY, A CORPORATION OF DELAWARE.

VIBRATING SCALPER.

Application filed April 28, 1925. Serial No. 26,450.

This invention relates to agitating machines, and more particularly to improved means for imparting a vibratory motion to a scalper sieve or screen used in sifting, sizing, separating or grading material.

The primary object of the invention is to provide gear wheels which are in mesh with each other and operatively connected to a scalper sieve or movable member, with means for imparting a distinct vibrating or jarring motion to the sieve, so that the material delivered to the sieve will be continuously agitated and the tendency of any of the particles to adhere to the meshes of the sieve will be reduced.

A further object contemplates the provision of means whereby a maximum amount of vibration is imparted to a screen of relatively small area to separate effectively the coarse and fine particles of material.

Other objects and advantages of the invention will become apparent from the description and claims hereinafter set forth.

Referring to the drawings, wherein is disclosed a preferred embodiment of the invention:

Figure 1 is a sectional view taken substantially along the line 1—1 of Figure 2, showing the rollers.

Figure 2 is a sectional view taken substantially along the line 2—2 of Figure 1 with the rollers omitted.

Figure 3 is a detail view of the gear wheels.

Figure 4 is a detail view of a modified form of gear wheel construction.

Figure 5 is a detail view of a further modification.

Referring to the drawings, in which like numerals indicate like parts in the several views, 10 denotes the side walls of a mill casing or the like, which is preferably provided with a wood lining 11. The grain or material 12 to be treated is first crushed between the break rollers 13 and 14, and then delivered by the feed board 15 onto the screen or sieve 16 of the scalper in the manner as clearly shown in Figure 1.

The sieve 16 is preferably mounted within and carried by a supporting frame 17, which frame comprises a pair of longitudinally extending side members or bars 18 and 19, suitably connected to the transverse end member 20. The sieve 16 is supported in position by the side bars 22 and the cross bars 23, 24 and 25, and is secured to these bars by means of strips 26, which are placed over the sieve or screen and fastened to the bars by the screws 27.

The sieve supporting frame 17 is yieldably connected to the sides of the casing, preferably by means of the substantially U-shaped brackets 28, secured to the adjacent walls of the lining 11. Extending through each of the brackets 28 is a bolt 29 connected to the sieve supporting frame 17 by the nut 30. A coil spring 31 confined between a collar 32 carried by the bolt 29, and the upper arm of the bracket 28, tends to normally urge the frame 17 downwardly. Each of the bolts 29 is further provided at its upper end with an enlarged head 33 which cooperates with an adjustable stop nut 34, the stem or shank of the stop 34 being externally threaded so as to engage a correspondingly threaded portion in the upper arm of the bracket 28. A lock nut 35, threaded to the shank of the stop 34, enables the latter to be rigidly secured in any adjusted position relative to the bracket 28, so that the downward pressure of the springs 31 on the frame 17 may be varied and the amplitude of vibration of the sieve 16 may be regulated, depending upon the particular material being treated.

A movable shaft 36 extends through the casing 10 and is non-rotatably or fixedly secured to the underside of the screen frame by the bolts 37, as shown in Figure 2. A gear-toothed wheel 38, having a bushing 39, is journalled to the opposite ends of the shaft 36, and is preferably maintained in position thereon by the collars 40 and 41, which are secured to the shaft by the set screws 42. The wheels 38 are arranged to mesh with similarly formed gear wheels 43 keyed to the drive shaft 44 by the screws 45. The drive shaft 44 is suitably supported by the bearings 47 secured to the outer walls of the casing 10 by the bolts 48. A drive pulley 49, carried by the shaft 44 may be connected to any suitable power means, not shown, for rotating the wheels.

In order that a positive vibrating or jarring motion may be imparted to the scalper 16 when the drive shaft 44 is rotated, the peripheral surface of the wheels 38 may be provided with a series of spaced grooves 50 of shallower or lesser depth than the rounded teeth or projections 51 on the wheel 43, so as to cause the teeth 51 to "bottom" in the roots of the grooves 50. As the shaft 36 on which the wheels 38 are journalled is movably mounted in the casing, the rotation of the wheels 38 and 43 will cause a hammer-like vibration to be given to the frame 17, thus thoroughly agitating the material as it is delivered to the screen 16.

The scalper frame 17, being yieldably suspended from the stationary brackets 28, normally will be urged downwardly by the springs 31 so as to cause the heads 33 of the bolts 29 to bear upon the adjustable stops 34. When the shaft 44 is rotated, the striking projections 51 on the gear wheels 43 will mesh with the receiving grooves 50 on the wheels 38 in such a manner as to cause the gear wheels to overcome the downward pressure of the springs 31 and impart a distinct jarring motion to the scalper 16. It will be noted that there is sufficient clearance in the sides of the casing 10 and lining 11 to permit the shaft 36 to be moved relative thereto when the machine is in operation.

Furthermore, due to the positive up and down jarring motion imparted to the sieve, the material will be continuously agitated so that the coarse particles will be permitted to slide over the lower end of the sieve to a suitable point of delivery, while the finer particles will be conducted through the sieve to a trough 52, where it is carried in any suitable manner to an outlet opening, not shown. The tendency of any of the particles to adhere to the screen and clog up the openings therein will be obviated, since the hammer-like vibration imparted to the screen on its downward movement will dislodge any of the particles that stick to the mesh of the screen.

As the gear wheels impart a constant and uniform vibratory motion to the scalper frame 17, it will be seen that a thorough separation of the material may be effected with a screen of relatively small area. Additionally, the amplitude of vibration of the sieve may be controlled by the adjustment of the tension of the springs 31 so that in the event it should be found desirable either to increase or decrease the action of the sieve, the same may be readily effected.

In the form of the invention illustrated in Fig. 4, the drive shaft 54 has keyed thereto a gear wheel 55 in mesh with a complementary gear wheel 56 journalled to the non-rotatable shaft 57, which shaft is connected to the scalper frame 17 in substantially the same manner as is the shaft 36 previously described. The teeth 58 of the gear wheel 57 are of the same size and depth as the teeth 59 on the gear wheel 55, so as to cause each tooth to bottom when brought into registry with its aligned groove in the adjacent wheel. It will be seen that by having the gear teeth of both wheels of equal size there will be imparted a double number of vibrations to the sieve than where only the teeth of one wheel bottom.

In the modified form of the invention shown in Figure 5, the gear wheel 60 having teeth 61, is arranged to be mounted on a suitable drive shaft, and meshes with a gear wheel 62, preferably of larger diameter. The wheel 62 also has a larger or different number of grooves 63 and teeth 64 so as to prevent the same grooves on the wheel 62 from registering continually with the same teeth on the wheel 60, which tends to materially increase the durability of the wheels.

While for the purpose of illustration the invention has been shown as applied to a mill, it is obvious that the device is equally applicable for other uses, especially where it is desired to impart a vibrating or agitating motion to a movable member. Furthermore, such changes and modification of the development as fall within the purview of one skilled in the art may be made without departing from the spirit of the invention and the scope of the appended claims.

I claim:

1. The combination with a scalper sieve, of means for vibrating the sieve comprising a non-rotatable shaft connected to said sieve, a wheel journalled on said shaft and having a peripheral toothed surface, a drive shaft, a complementary toothed wheel keyed to said drive shaft and in mesh with said first mentioned wheel, the teeth on one of the wheels being longer than the depth of the grooves in the other wheel to impart a vibratory motion to the sieve, and means for driving said wheels.

2. The combination with a scalper sieve, of means for vibrating the sieve comprising a fixed shaft secured to the underside of said sieve, a wheel journaled on said shaft and having a peripheral toothed surface, a drive shaft, a gear-toothed wheel keyed to said drive shaft and in mesh with said first mentioned wheel, the grooves in said first mentioned wheel being shallower than the teeth in the second mentioned wheel so as to cause the wheels to bottom, and means for driving said wheels.

3. In a device of the class described, the combination of a casing, a scalper sieve mounted in said casing, means yieldably connecting said sieve to said casing, a non-rotatable shaft extending transversely through said casing and secured to said sieve, a gear-toothed wheel journalled to each end of the shaft, a drive shaft extending through the casing and having complementary gear-toothed wheels in mesh with said first mentioned wheels, the teeth on the wheels keyed to the drive shaft being longer than the depth of the grooves in the wheels journalled to the non-rotatable shaft, and means for rotating said wheels.

4. The combination with a movable sieve, of means for vibrating said sieve comprising a drive shaft, a gear-toothed wheel keyed to said shaft, a non-rotatable shaft connected to said sieve, a gear-toothed wheel journalled to the non-rotatable shaft and in mesh with said first mentioned gear wheel, the wheel journalled to the non-rotatable shaft having a larger number of teeth and grooves than the wheel on the drive shaft, and means on one of the wheels for imparting a vibrating motion to said sieve.

5. A vibrating means of the class described comprising a wheel having a gear-toothed peripheral surface, and a gear wheel having a correspondingly formed peripheral surface in mesh with said first mentioned wheel, the projections on one of the wheels being longer than the complementary grooves on the other wheel.

6. A vibrating means of the class described comprising a drive shaft, a gear-toothed wheel keyed to said shaft, a non-rotatable shaft, and a gear-toothed wheel journalled to the non-rotatable shaft and in mesh with said first mentioned gear wheel, the grooves in said last mentioned wheel being shallower than the teeth in the first mentioned wheel.

7. A vibrating means of the class described comprising a drive shaft, a gear-toothed wheel keyed to said shaft, a non-rotatable shaft and a gear-toothed wheel journalled to the non-rotatable shaft and in mesh with said first mentioned gear wheel, the grooves in said last mentioned wheel being of a larger number and shallower than the teeth in the last mentioned wheel.

In testimony whereof I have hereunto set my hand.

JOHN E. TAYLOR.